US012173611B2

(12) United States Patent
Selvam et al.

(10) Patent No.: US 12,173,611 B2
(45) Date of Patent: Dec. 24, 2024

(54) BALANCING DEVICE FOR SUPERCRITICAL SHAFT

(71) Applicant: General Electric Company, Schenectady, NY (US)

(72) Inventors: Vignesh Selvam, Trichy (IN); Raghavendra Muralidhar, Bengaluru (IN); Surender Reddy Bhavanam, Bengaluru (IN)

(73) Assignee: GENERAL ELECTRIC COMPANY, Evendale, OH (US)

( * ) Notice: Subject to any disclaimer, the term of this patent is extended or adjusted under 35 U.S.C. 154(b) by 79 days.

(21) Appl. No.: 17/808,211

(22) Filed: Jun. 22, 2022

(65) Prior Publication Data

US 2023/0250734 A1 Aug. 10, 2023

(30) Foreign Application Priority Data

Feb. 9, 2022 (IN) ............................. 202211006841

(51) Int. Cl.
*F01D 25/28* (2006.01)
*F01D 25/04* (2006.01)

(52) U.S. Cl.
CPC ............. *F01D 25/28* (2013.01); *F01D 25/04* (2013.01); *F05D 2230/60* (2013.01); *F05D 2240/61* (2013.01); *F05D 2260/32* (2013.01); *F05D 2260/36* (2013.01); *F05D 2260/38* (2013.01); *F05D 2260/96* (2013.01)

(58) Field of Classification Search
CPC .......... F01D 25/28; F01D 25/04; F01D 5/027; F05D 2230/60; F05D 2240/61; F05D 2260/32; F05D 2260/36; F05D 2260/38; F05D 2260/96
USPC ........................................................... 415/119
See application file for complete search history.

(56) References Cited

U.S. PATENT DOCUMENTS

| | | | | |
|---|---|---|---|---|
| 4,043,147 | A * | 8/1977 | Wiebe ................... | F16F 15/322 464/180 |
| 5,483,932 | A | 1/1996 | Friedman et al. | |
| 6,752,722 | B2 | 6/2004 | Armitage et al. | |
| 6,986,713 | B2 | 1/2006 | Dine et al. | |
| 7,533,646 | B2 | 5/2009 | Harms et al. | |
| 8,327,542 | B2 | 12/2012 | Tisch et al. | |
| 8,668,457 | B2 | 3/2014 | Juh | |
| 10,520,060 | B2 | 12/2019 | Okawa et al. | |
| 10,544,679 | B2 | 1/2020 | Lopez et al. | |
| 2016/0326876 | A1* | 11/2016 | Lopez ................... | F04D 29/662 |

FOREIGN PATENT DOCUMENTS

| | | | |
|---|---|---|---|
| DE | 4211629 | B4 | 11/2004 |
| FR | 3127024 | A1 | 3/2023 |
| FR | 3127025 | A1 | 3/2023 |

* cited by examiner

*Primary Examiner* — Yi-Kai Wang
(74) *Attorney, Agent, or Firm* — Venable LLP; Griffin A. A. Deadwick; Michele V. Frank

(57) ABSTRACT

A device for balancing a shaft in a turbomachine engine includes an annular insert configured to be positioned inside the shaft at any axial position along the shaft, and a weight that is attached to the annular insert at any angular position inside the shaft.

16 Claims, 11 Drawing Sheets

BALANCING DEVICE FOR SUPERCRITICAL SHAFT

CROSS REFERENCE TO RELATED APPLICATIONS

The present application claims the benefit of Indian Patent Application No. 202211006841, filed on Feb. 9, 2022, which is hereby incorporated by reference herein in its entirety.

TECHNICAL FIELD

The present disclosure relates to turbomachine engines, including turbomachine shafts, and driving such turbomachine shafts in such turbomachine engines. In more detail, the present disclosure relates to a balancing device for, for example, a supercritical shaft in such turbomachine engines.

BACKGROUND

A turbofan engine, or a turbomachinery engine, includes a core engine and a power turbine that drives a bypass fan. The bypass fan generates the majority of the thrust of the turbofan engine. The generated thrust can be used to move a payload (e.g., an aircraft). A turbomachine shaft coupled to the power turbine and fan (either directly or through a gearbox) may be characterized by its first-order beam bending mode, the fundamental resonance frequency of this mode, and a critical speed of rotation that corresponds to the fundamental frequency. If this bending mode occurs within the standard operating range of the engine, high vibration as well as an increased risk of whirl instability may result. There is a continuing need to address vibrations induced by rotating shafts in turbomachinery engines.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Figure 1:
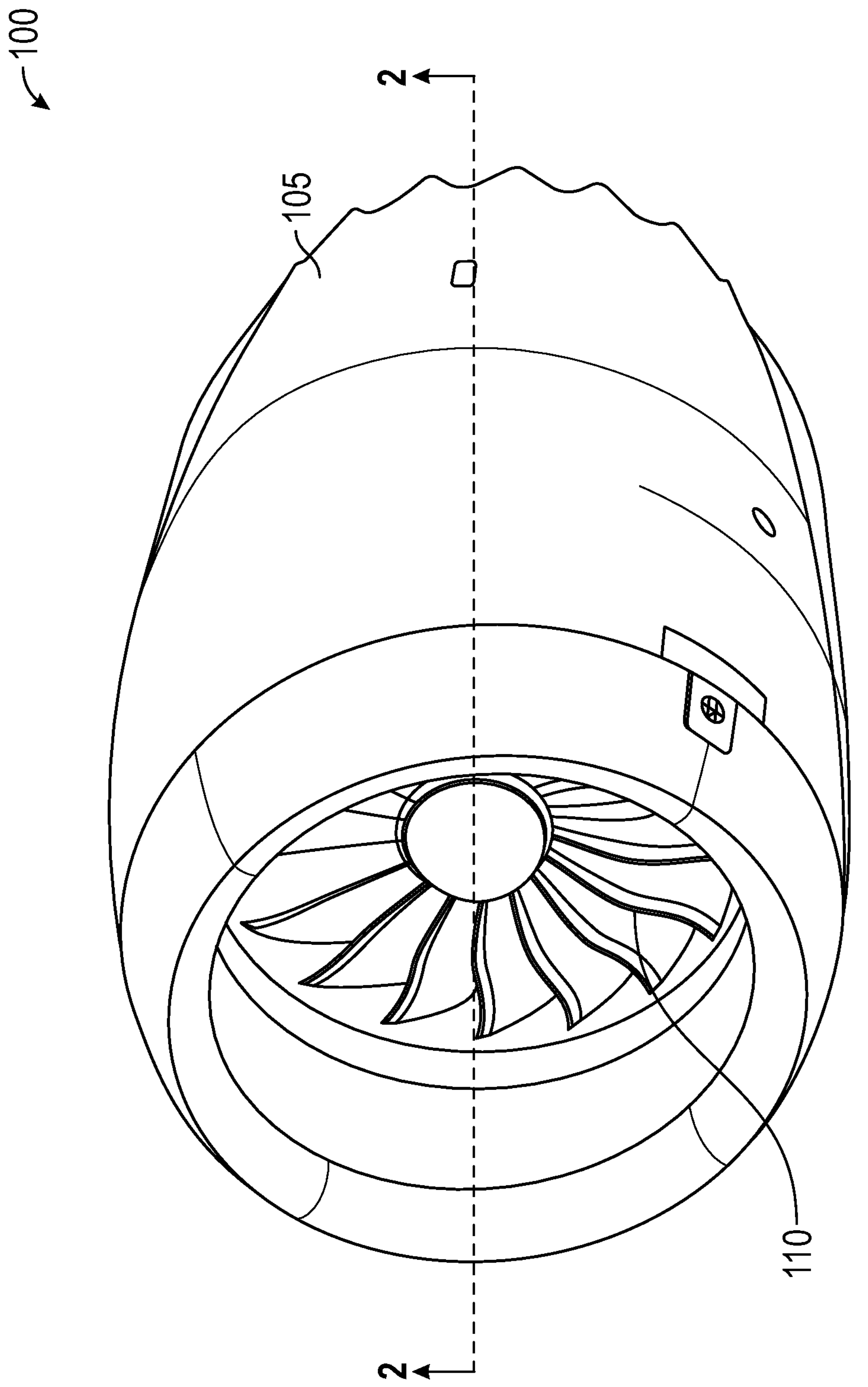
FIG. 1 shows an example of a turbomachine engine, according to an embodiment of the present disclosure.

Features, advantages, and embodiments of the present disclosure are set forth or apparent from a consideration of the following detailed description, drawings, and claims. Moreover, it is to be understood that the following detailed description is intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and scope of the present disclosure.

As used herein, the terms "first," "second," and "third" may be used interchangeably to distinguish one component from another and are not intended to signify location or importance of the individual components.

The terms "fore" (or "forward") and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "outer" and "inner" refer to relative positions within a turbomachine engine, from a centerline axis of the engine. For example, outer refers to a position further from the centerline axis and inner refers to a position closer to the centerline axis.

The terms "coupled," "fixed," "attached to," and the like, refer to both direct coupling, fixing, or attaching, as well as indirect coupling, fixing, or attaching through one or more intermediate components or features, unless otherwise specified herein.

The term "propulsive system" refers generally to a thrust-producing system, which thrust is produced by a propulsor, and the propulsor provides the thrust using an electrically-powered motor(s), a heat engine such as a turbomachine, or a combination of electrical motor(s) and a turbomachine.

The singular forms “a,” “an,” and “the” include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as “about,” “approximately,” and “substantially”, are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a one, two, four, ten, fifteen, or twenty percent margin in either individual values, range(s) of values, and/or endpoints defining range(s) of values.

The terms “low” and “high,” or their respective comparative degrees (e.g., “lower” and “higher”, where applicable), when used with the compressor, turbine, shaft, or spool components, each refers to relative pressures and/or relative speeds within an engine unless otherwise specified. For example, a “low-speed shaft” defines a component configured to operate at a rotational speed, such as a maximum allowable rotational speed, which is lower than that of a “high-speed shaft” of the engine. Alternatively, unless otherwise specified, the aforementioned terms may be understood in their superlative degree. For example, a “low-pressure turbine” may refer to the lowest maximum pressure within a turbine section, and a “high-pressure turbine” may refer to the highest maximum pressure within the turbine section. The terms “low” or “high” in such aforementioned regards may additionally, or alternatively, be understood as relative to minimum allowable speeds and/or pressures, or minimum or maximum allowable speeds and/or pressures relative to normal, desired, steady state, etc., operation.

As used herein, “redline speed” means the maximum expected rotational speed of a shaft during normal operation of an engine. The redline speed may be expressed in terms of rotations per second in Hertz (Hz), rotations per minute (RPM), or as a linear velocity of the outer diameter of the shaft in terms of feet per second.

As used herein, “critical speed” means a rotational speed of the shaft that is about the same as the fundamental, or natural frequency of a first-order bending mode of the shaft (e.g., the shaft rotates at eighty Hz and the first-order modal frequency is eighty Hertz). When the shaft rotates at the critical speed, the shaft is expected to have a maximum amount of deflection, hence, instability, due to excitation of the first-order bending mode of the shaft. The critical speed may be expressed in terms of rotations per second in Hertz (Hz), rotations per minute (RPM), or as a linear velocity of the outer diameter of the shaft in terms of feet per second.

As used herein, “critical frequency” is a synonym for the fundamental, or natural frequency, of the first-order bending mode of the shaft.

The term “subcritical speed” refers to a shaft redline speed that is less than the fundamental, or natural frequency of the first-order bending mode of the shaft (e.g., the shaft rotates at a redline speed of 70 Hz while the first-order modal frequency is about 80 Hertz). When the rotational speed is subcritical, the shaft is more stable than when rotating at a critical speed. A “subcritical shaft” is a shaft that has a redline speed below the critical speed of the shaft.

The term “supercritical speed” refers to a shaft rotational speed that is above the fundamental, or natural frequency of the first-order bending mode of the shaft (e.g., the shaft rotates at eighty Hz while the first-order modal frequency is about seventy Hertz). A supercritical shaft is less stable than a subcritical shaft because the shaft speed can pass through the critical speed since its fundamental mode is below the redline speed. A “supercritical shaft” is a shaft that has a redline speed above the critical speed of the shaft.

One or more components of the turbomachine engine described herein below may be manufactured or formed using any suitable process, such as an additive manufacturing process, such as a three-dimensional (3D) printing process. The use of such a process may allow such a component to be formed integrally, as a single monolithic component, or as any suitable number of sub-components. In particular, the additive manufacturing process may allow such a component to be integrally formed and include a variety of features not possible when using prior manufacturing methods. For example, the additive manufacturing methods described herein enable the manufacture of shafts having unique features, configurations, thicknesses, materials, densities, passageways, headers, and mounting structures that may not have been possible or practical using prior manufacturing methods. Some of these features are described herein.

This disclosure and various embodiments relate to a turbomachine engine, also referred to as a gas turbine engine, a turboprop engine, or a turbomachine. These turbomachine engines can be applied across various technologies and industries. Various embodiments may be described herein in the context of aeronautical engines and aircraft machinery.

In some instances, a turbomachine engine is configured as a direct drive engine. In other instances, a turbomachine engine can be configured as a geared engine with a gearbox. In some instances, a propulsor of a turbomachine engine can be a fan encased within a fan case and/or a nacelle. This type of turbomachine engine can be referred to as “a ducted engine.” In other instances, a propulsor of a turbomachine engine can be exposed (e.g., not within a fan case or a nacelle). This type of turbomachine engine can be referred to as “an open rotor engine” or an “unducted engine.”

Newer engine architectures may be characterized by faster shaft speeds for the low-pressure turbine (LPT), can have longer shafts to accommodate a longer core, and be required to operate within a more limited radial space. These requirements can result in reductions in stiffness-to-weight ratio, however, that have the effect of lowering the critical speed and/or limiting the available options for increasing the critical speed for the LPT shaft. Accordingly, different approaches for balancing the LPT shaft are required for next-generation turbomachine engines, to permit high-speed and even supercritical operation without resulting in an unstable bending mode during regular operation.

Some embodiments balance a supercritical shaft using balancing devices inside the shaft to reduce excessive vibration at supercritical speeds. The balancing devices may be one or more generally disc-shaped balancing devices that can be inserted at any required position(s) and/or angle(s) in the shaft. Such discs may have slots, holes, or compartments to insert balancing weights, which may be solid, fluid, powder, or have weighted portions that are integral to the balancing device. Each balancing device may be inserted (and removed) at the required position and oriented at the required angle using specially-designed insertion tools.

FIG. 1 shows an example of a turbomachine engine 100, according to an embodiment of the present disclosure. Types of such engines include turboprops, turbofans, turbomachines, and turbojets. The turbomachine engine 100 is a ducted engine covered by a protective cowl 105, so that the only component visible in this exterior view is a fan assembly 110. A nozzle, not visible in FIG. 1, also protrudes from the aft end of the turbomachine engine 100 beyond the protective cowl 105.

Figure 2:
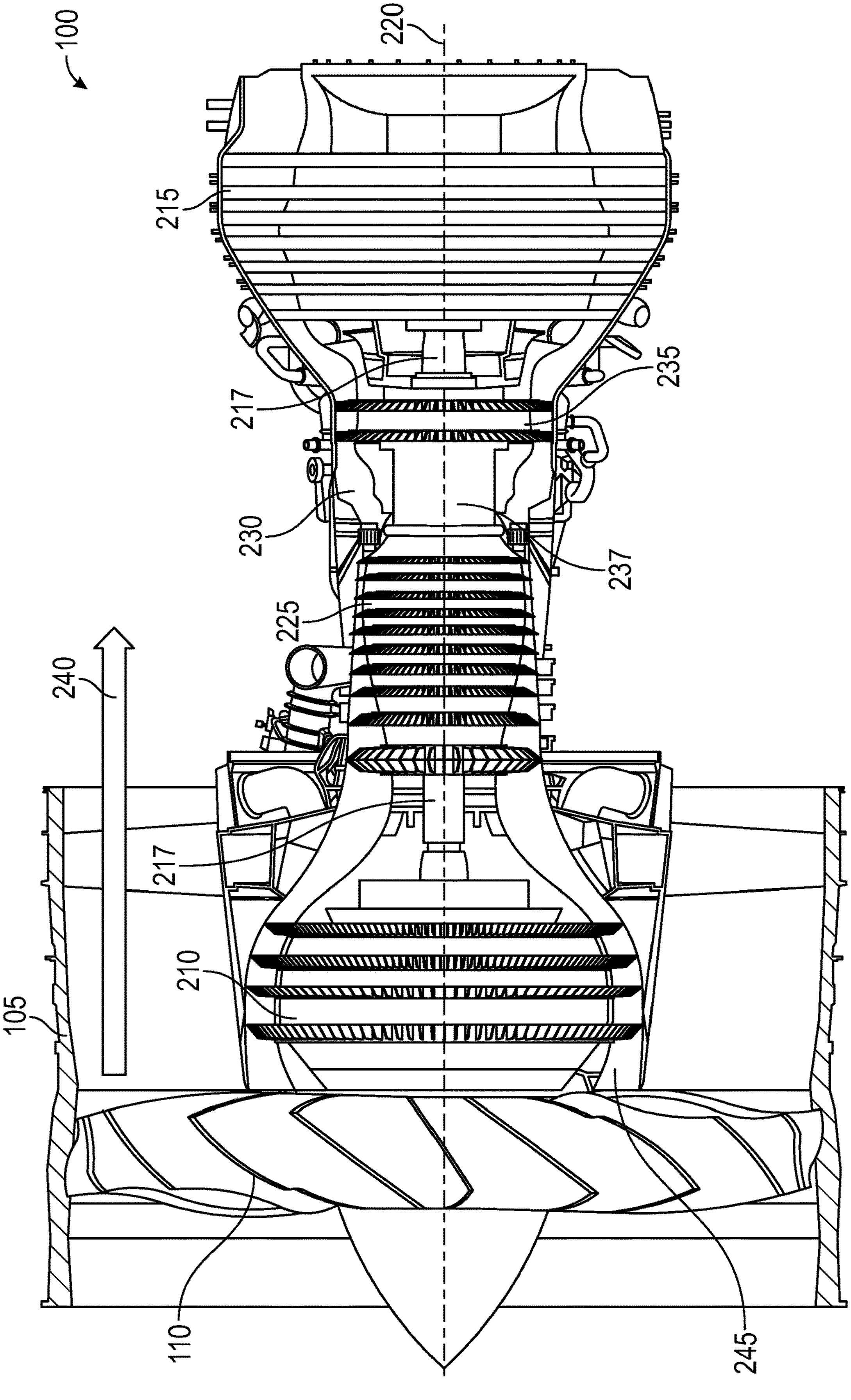
FIG. 2 shows a schematic, cross-sectional view taken along line 2-2 of the turbomachine engine shown in FIG. 1.

FIG. 2 shows a schematic, cross-sectional view taken along line 2-2 of the turbomachine engine 100 shown in FIG. 1, which may incorporate one or more embodiments of the present disclosure. In this example, the turbomachine engine 100 is a two-spool turbomachine that includes a high-speed system and a low-speed system, both of which are fully covered by the protective cowl 105. The low-speed system of the turbomachine engine 100 includes the fan assembly 110, a low-pressure compressor 210 (also referred to as a booster), and a low-pressure turbine 215, all of which are coupled to a low-pressure shaft 217 (also referred to as the low-pressure spool) that extends between the low-speed system components along a centerline axis 220 of the turbomachine engine 100. The low-pressure shaft 217 enables the fan assembly 110, the low-pressure compressor 210, and the low-pressure turbine 215 to rotate in unison about the centerline axis 220.

The high-speed system of the turbomachine engine 100 includes a high-pressure compressor 225, a combustor 230, and a high-pressure turbine 235, all of which are coupled to a high-pressure shaft 237 that extends between the high-speed system components along the centerline axis 220 of the turbomachine engine 100. The high-pressure shaft 237 enables the high-pressure compressor 225 and the high-pressure turbine 235 to rotate in unison about the centerline axis 220, at a different rotational speed than the rotation of the low-pressure components (and, in some embodiments, at a higher rotational speed, and/or a counter-rotating direction, relative to the low-pressure system).

The components of the low-pressure system and the high-pressure system are positioned so that a portion of the air taken in by the turbomachine engine 100 flows through the turbomachine engine 100 in a flow path from fore to aft through the fan assembly 110, the low-pressure compressor 210, the high-pressure compressor 225, the combustor 230, the high-pressure turbine 235, and the low-pressure turbine 215. Another portion of the air intake by the turbomachine engine 100 bypasses the low-pressure system and the high-pressure system, and flows from fore to aft as shown by arrow 240.

This portion of air entering the flow path of the turbomachine engine 100 is supplied from an inlet 245. For the embodiment shown in FIG. 2, the inlet 245 has an annular or an axisymmetric three hundred sixty-degree configuration, and provides a path for incoming atmospheric air to enter the turbomachinery flow path, as described above. Such a location may be advantageous for a variety of reasons, including management of icing performance as well as protecting the inlet 245 from various objects and materials as may be encountered in operation. In other embodiments, however, the inlet 245 may be positioned at any other suitable location, e.g., arranged in a non-axisymmetric configuration.

The combustor 230 is located between the high-pressure compressor 225 and the high-pressure turbine 235. The combustor 230 can include one or more configurations for receiving a mixture of fuel from a fuel system (not shown in FIG. 2) and air from the high-pressure compressor 225. This mixture is ignited by an ignition system (not shown in FIG. 2), creating hot combustion gases that flow from fore to aft through the high-pressure turbine 235, which provides a torque to rotate the high-pressure shaft 237 and, thereby, to rotate the high-pressure compressor 225. After exiting the high-pressure turbine, the combustion gases continue to flow from fore to aft through the low-pressure turbine 215, which provides a torque to rotate the low-pressure shaft 217 and, thereby, to rotate the low-pressure compressor 210 and the fan assembly 110.

In other words, the forward stages of the turbomachine engine 100, namely, the fan assembly 110, the low-pressure compressor 210, and the high-pressure compressor 225, all prepare the intake air for ignition. The forward stages all require power in order to rotate. The rear stages of the turbomachine engine 100, namely, the combustor 230, the high-pressure turbine 235, and the low-pressure turbine 215, provide that requisite power, by igniting the compressed air and using the resulting hot combustion gases to rotate the low-pressure shaft 217 and the high-pressure shaft 237 (also referred to as spools or rotors). In this manner, the rear stages use air to physically drive the front stages, and the front stages are driven to provide air to the rear stages.

As the exhaust gas exits out of the aft end of the rear stages, the exhaust gas reaches the nozzle at the aft end of the turbomachine engine 100 (not shown in FIG. 2). When the exhaust passes over the nozzle, and combines with the bypassed air that is also being driven by the fan assembly 110, an exhaust force is created that is the thrust generated by the turbomachine engine 100. This thrust propels the turbomachine engine 100, and, for example, an aircraft to which it may be mounted, in the forward direction.

As in the embodiment shown in FIG. 2, the fan assembly 110 is located forward of the low-pressure turbine 215 in a "puller" configuration, and the exhaust nozzle is located aft. As is depicted, the fan assembly 110 is driven by the low-pressure turbine 215, and, more specifically, is driven by the low-pressure shaft 217. More specifically, the turbomachine engine 100 in the embodiment shown in FIG. 2 includes a power gearbox (not shown in FIG. 2), and the fan assembly 110 is driven by the low-pressure shaft 217 across the power gearbox. The power gearbox may include a gearset for decreasing a rotational speed of the low-pressure shaft 217 relative to the low-pressure turbine 215, such that the fan assembly 110 may rotate at a slower rotational speed than does the low-pressure shaft 217. Other configurations are possible and contemplated within the scope of the present disclosure, such as what may be termed a "pusher" configuration embodiment in which the low-pressure turbine 215 is located forward of the fan assembly 110.

The turbomachine engine 100 depicted in FIGS. 1 and 2 is by way of example only. In other embodiments, the turbomachine engine 100 may have any other suitable configuration, including, for example, any other suitable number of shafts or spools, fan blades, turbines, compressors, etc., and the power gearbox may have any suitable configuration, including, for example, a star gear configuration, a planet gear configuration, a single-stage, a multi-stage, epicyclic, non-epicyclic, etc. The fan assembly 110 may be any suitable fixed-pitched assembly or variable-pitched assembly. The turbomachine engine 100 may include additional components not shown in FIGS. 1 and 2, such as vane assemblies and/or guide vanes, etc.

During operation, the low-pressure shaft 217 rotates with a rotational speed that can be expressed in either rotations per minute (RPM), or as an outer diameter (OD) speed expressed in units of linear velocity, such as feet per second (ft/sec). The rotational stability of the low-pressure shaft 217 relative to its operational range may be characterized by the resonance frequency of the fundamental or first order bending mode. When an operational speed is the same as this resonance frequency, the low-pressure shaft 217 is operating at its critical speed. The low-pressure shaft 217 has a mode shape for this first-order bending mode that may be generally described as a half-sinusoid, with a midshaft location undergoing maximum displacement and, therefore, having a maximum kinetic energy of displacement relative to other portions of the low-pressure shaft 217. This unstable mode is a standing wave across the length of the low-pressure shaft 217. The maximum deflection occurs when the excitation source has a periodicity or a cyclic component near to the fundamental frequency. This instability cannot be fully mitigated with the use of bearing dampers at the ends of the shaft or balance lands on the shaft surface. When an engine is designed, the shaft speed expected to produce the highest deflection or instability at the midshaft is the shaft speed that equals the critical speed.

If the critical speed of the shaft critical speed falls within the standard operational range, i.e., if the critical speed is below the redline speed or the low-pressure shaft 217 is a supercritical shaft, then, during routine operation, the low-pressure shaft 217 may at times operate at or pass through the critical speed, which induces an unstable condition. Even if the engine is operated at the critical speed temporarily, there is a possibility of undetected vibration, whirl instability, and some likelihood of damage.

One way to stabilize a supercritical shaft is to use a balancing device to reduce the effect of the bending mode during operation at or near the critical speed. The balancing device of some embodiments is an annular insert configured to be positioned inside the shaft, at any required axial (i.e., horizontal) position along the shaft, and a removable weight that is attached to the annular insert at a particular angular position inside the shaft. The required position of the annular insert, the angular position of the weight, and the mass of the weight are all selected to minimize the observed, estimated, or simulated displacement of the supercritical shaft along its length. In practice, any number of annular inserts and/or weights may be used to balance the shaft, either during manufacture or afterwards. The axial and angular positions are adjustable and/or removable after installation, such as during routine maintenance or repair, as well.

In some embodiments, the annular insert is a solid disc assembly, and the weight couples to the solid disc assembly by a receiver in the solid disc assembly. The weight may be any solid object directly coupled to a solid disc, using a mechanism such as a keyway, a clip, a strip, or a screw. The weight may be solid metal (e.g., steel, aluminum, etc.), metal composite, fluid, or metal powder. The receiver in the solid disc is an opening designed to receive the weight, such as a slot or a hole.

Figure 3A:
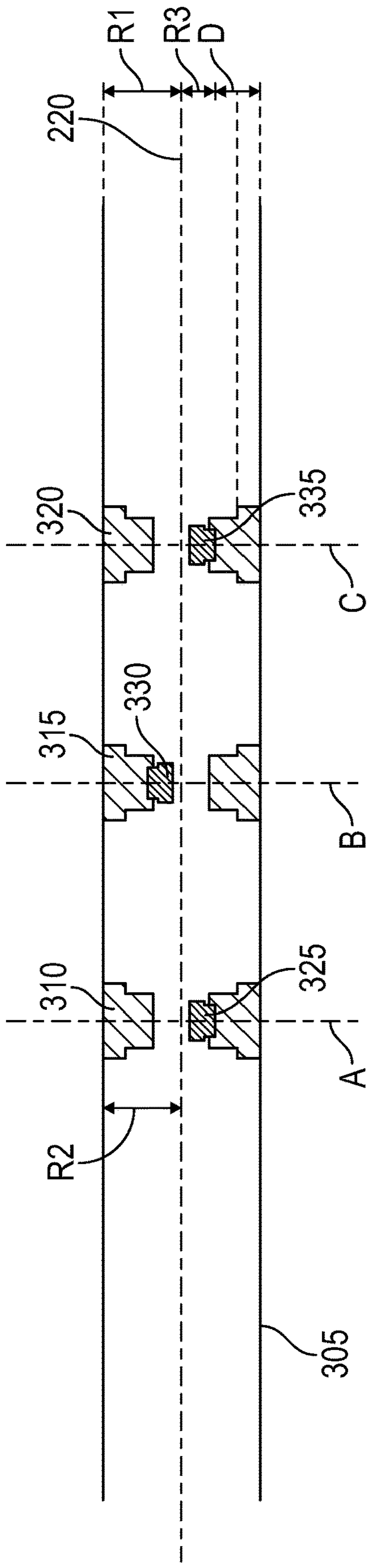
FIG. 3A shows a cross-sectional view taken along a centerline axis of a low-pressure shaft that is balanced with three weights attached to three (or any number) of balancing devices.

FIG. 3A conceptually illustrates an example of a low-pressure shaft 305 that is balanced with three balancing devices 310, 315, 320. The balancing devices 310, 315, 320 are also referred to herein as solid annular disc assemblies, each with an outer radius R1 that, when locked into place, is equal to the inner radius R2 of the shaft. An annular width D of the balancing devices 310, 315, 320 is also shown, at an exaggerated size for clarity, and is defined as the difference between the outer radius R1 and an inner radius R3 of the balancing devices 310, 315, 320. R1, R2, and R3 are measured from the centerline axis 220 of the turbomachine engine 100, that is the shared axis of rotation of the low-pressure shaft 305 and the balancing devices 310, 315, 320.

Each of the balancing devices 310, 315, 320 is located at a different position along the shaft and has a corresponding weight 325, 330, 335 attached at a different angular position within the shaft. Specifically, in this example, balancing device 310 is located at axial position A, balancing device 315 is located at axial position B, and balancing device 320 is located at axial position C. These positions are illustrated in FIG. 3A by dotted lines.

Figure 3B:
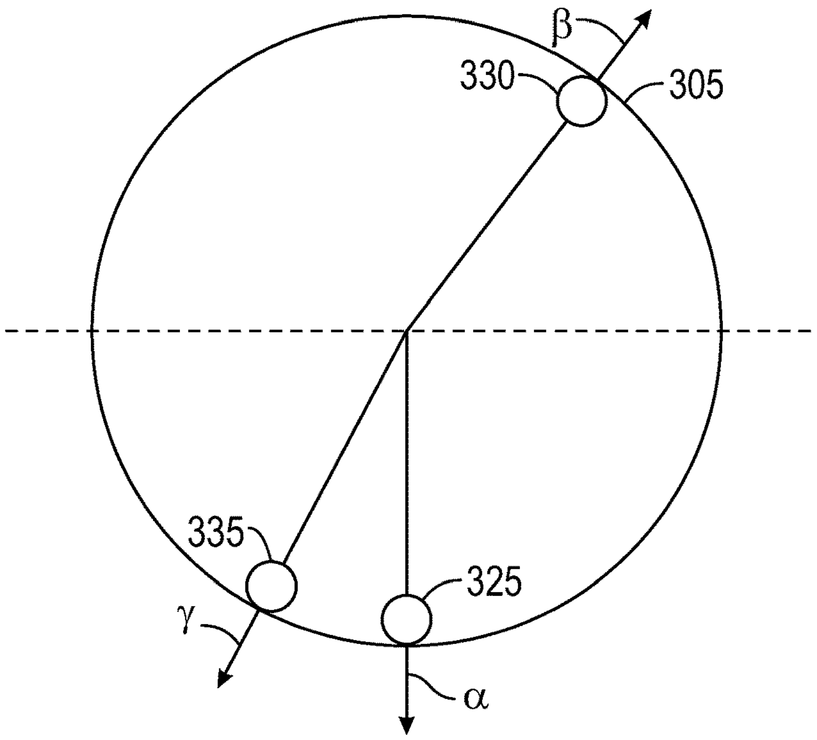
FIG. 3B shows that the weights of FIG. 3A are oriented at different angles corresponding to different directions of displacement of the low-pressure shaft at different axial positions along the shaft.

FIG. 3B is a conceptual schematic that shows how the weights 325, 330, 335 are oriented at different angles corresponding to different directions of displacement of the low-pressure shaft 305 at those positions along the shaft. Specifically, FIG. 3B shows an end-on view from the aft end of the low-pressure shaft 305 looking forward, with each of the weights 325, 330, 335 depicted schematically at their respective relative angular positions. Weight 325 is oriented on balancing device 310 (FIG. 3A) at angular position a, weight 330 is oriented on balancing device 315 (FIG. 3A) at angular position B, and weight 335 is oriented on balancing device 320 (FIG. 3A) at angular position y. From the figure, it can be seen in this example that weights 325, 335 are positioned at angular positions that are approximately opposite to the angular position of weight 330. Each weight may be oriented at its desired angular position by rotating the balancing device itself during insertion within the shaft.

Figure 3C:
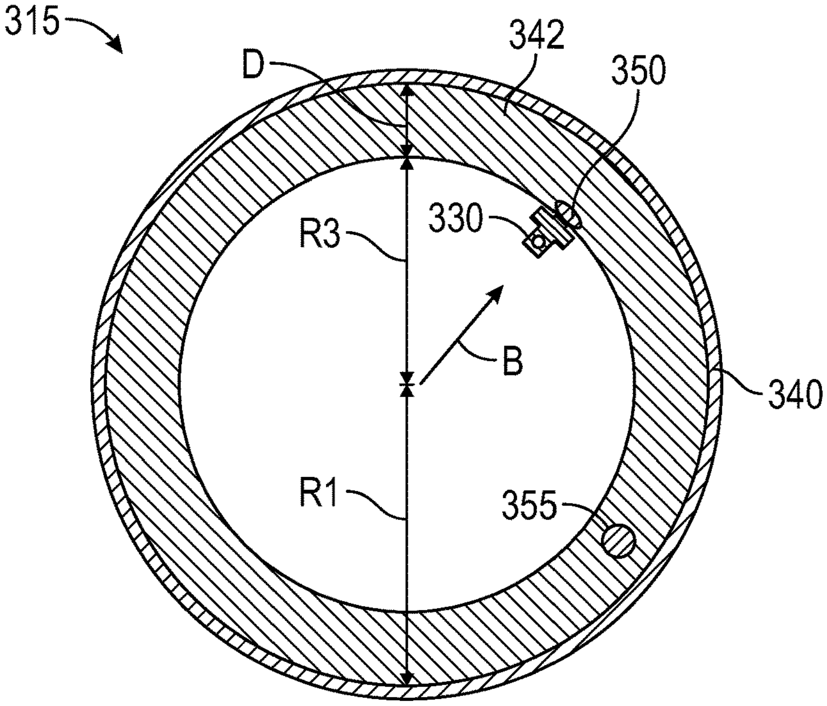
FIG. 3C shows a schematic, cross-sectional view taken along line B of one of the balancing devices of FIG. 3A, from the aft end of the low-pressure shaft looking forward.

FIG. 3C shows a schematic of the balancing device 315 and the weight 330, from the aft end of the low-pressure shaft 305 looking forward. The annular width D, the outer radius R1, and the inner radius R3 of the balancing device 315 are also illustrated in FIG. 3C. Note that the low-pressure shaft 305 is omitted from FIG. 3C for clarity. The balancing device 315 has an outer portion 340 that comes into contact with the interior surface of the low-pressure shaft 305, and an inner portion 342 to which the weight 330 attaches. The inner portion 342 and the outer portion 340 may be different components that are joined together (e.g., by welding) or alternatively may be different portions of a single, unitary component. In this example, the weight 330 attaches by a slot 350 in the inner portion 342. However, as an alternative, the weight 330 could also attach to a hole 355 in the inner portion 342 using a clip or other means. In this example, balancing device 315 has been rotated so that weight 330 is at an angular position indicated by solid arrow B.

In some embodiments, the solid disc assembly has multiple solid segments, each solid segment spanning a portion of the interior circumference of the shaft. Each solid segment has at least one receiver (e.g., slots, holes, etc.) to which a weight may be coupled. The balancing device also may include an anti-rotation pin that extends through the surface of the low-pressure shaft 305 and into the solid segment of the solid disc assembly beneath. The anti-rotation pin prevents rotation of the solid disc within the shaft by physically coupling the shaft to the solid segment. The solid disc assembly may also include a number of springs, each spring being positioned between two of the solid segments, and each spring exerting a pressure upon adjacent solid segments to couple the solid segments to each other.

Figure 4B:
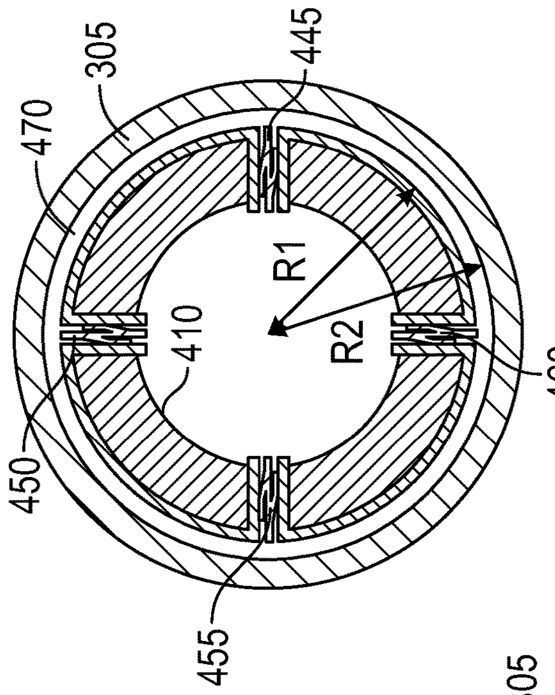
FIG. 4B shows a schematic, cross-sectional view of the balancing device of FIG. 4A during insertion within the low-pressure shaft, prior to being locked in place.
Figure 4C:
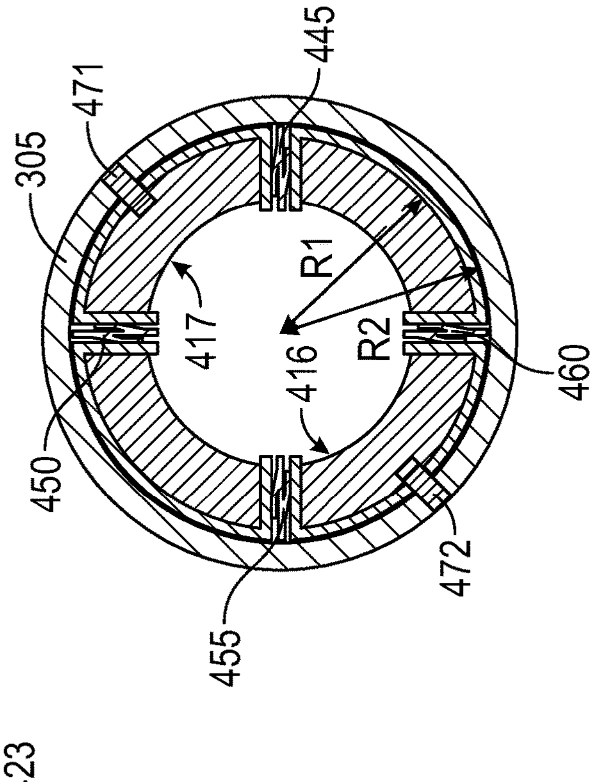
FIG. 4C shows a schematic, cross sectional view of the balancing device of FIG. 4A after insertion, and locked into place at the desired axial position along the low-pressure shaft.
Figure 4A:
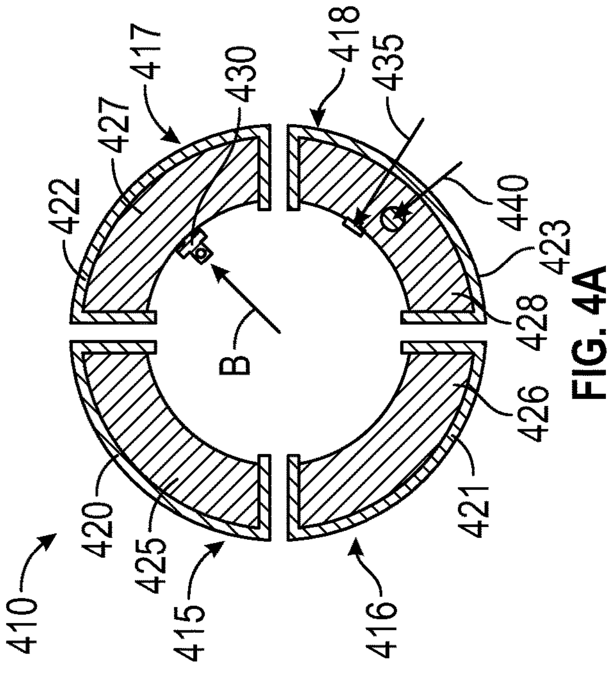
FIG. 4A shows a schematic, cross-sectional view of another example of a balancing device, that is a solid disc assembly with multiple solid segments.

FIG. 4A shows an example of a balancing device 410 that is a solid disc assembly with multiple solid segments 415, 416, 417, 418. The balancing device 410 is in a pre-insertion state, outside of the low-pressure shaft 305. The solid segments 415, 416, 417, 418 have corresponding outer portions 420, 421, 422, 423 that, when the balancing device 410 is installed in the low-pressure shaft 305, come into direct contact with the interior circumference of the low-pressure shaft 305 (FIG. 4B). The solid segments 415, 416, 417, 418 also have corresponding inner portions 425, 426, 427, 428, to which weights may be attached. As with the example of FIG. 3C, each of the inner portions 425, 426, 427, 428 and their corresponding outer portions 420, 421, 422, 423 may be different components that are joined together (e.g., by welding) or alternatively may be different portions of single, unitary components.

In the example of FIG. 4A, the solid segment 417 has a weight 430 attached at an angular position indicated by arrow B. In addition, the solid segment 418 has two receivers, one being a slot 435 and the other being a hole 440, to which additional weights could be attached. The solid segments 415, 416 do not have any receivers in this example. The weight 430 was attached prior to insertion of the balancing device 410 within the low-pressure shaft 305. Additional weights may be attached to the balancing device 410 after insertion, for example into the slot 435 or the hole 440.

FIG. 4B shows the balancing device 410 during insertion within the low-pressure shaft 305, prior to being locked in place. In this example, a spring pack including springs 445, 450, 455, 460 are inserted between solid segments 415, 416, 417, 418 and are compressed during insertion of the balancing device 410 within the low-pressure shaft 305, so that the outer radius R1 of the balancing device 410 is less than the inner radius R2 of the low-pressure shaft 305. The result of the compressing of the springs 445, 450, 455, 460 creates a clearance 470 (of a width equal to R2-R1), which permits free movement of the balancing device 410 within the low-pressure shaft 305, until the balancing device 410 reaches the desired axial position along the low-pressure shaft 305.

FIG. 4C shows the balancing device 410 after insertion within the low-pressure shaft 305, and locked into place at the desired axial position along the low-pressure shaft 305. This is achieved by releasing the springs 445, 450, 455, 460 so that the outer radius R1 of the balancing device 410 is equal to the inner radius R2 of the low-pressure shaft 305. Upon release, the springs 445, 450, 455, 460 exert a force that causes the solid segments 415, 416, 417, 418 to be pushed and secured into place along the interior surface of the low-pressure shaft 305, as well as being coupled to each other. The force ensures that the balancing device 410 cannot move axially along the low-pressure shaft 305, away from the desired axial position after insertion.

FIG. 4C also shows examples of anti-rotation pins 471, 472 that are metal pins or screws that can be used to prevent circumferential rotation of the balancing device 410 within the low-pressure shaft 305 after insertion. In this example, two of the anti-rotation pins 471, 472 are used, though as few as one, and as many as one per segment, could be utilized. The pins can be inserted from outside, through holes that are drilled through the low-pressure shaft 305, and that extend in this example into the body of the solid segments 416, 417.

In some embodiments, an insertion tool is used that simultaneously compresses all of the springs 445, 450, 455, 460 in the spring pack during insertion of the balancing device 410 within the low-pressure shaft 305 to facilitate moving the solid disc assembly along the low-pressure shaft 305 to the desired axial position. The insertion tool is also used to simultaneously release all of the springs 445, 450, 455, 460 when the solid disc assembly has reached the desired axial position, to allow the springs 445, 450, 455, 460 to expand in unison and thereby to lock the solid disc assembly into place at the desired axial position. In some embodiments, the insertion tool has a pulling rod to release the springs 445, 450, 455, 460, and a holding rod to hold the solid disc assembly in place at the desired position during the release of the springs 445, 450, 455, 460 by the pulling rod.

Figure 5A:
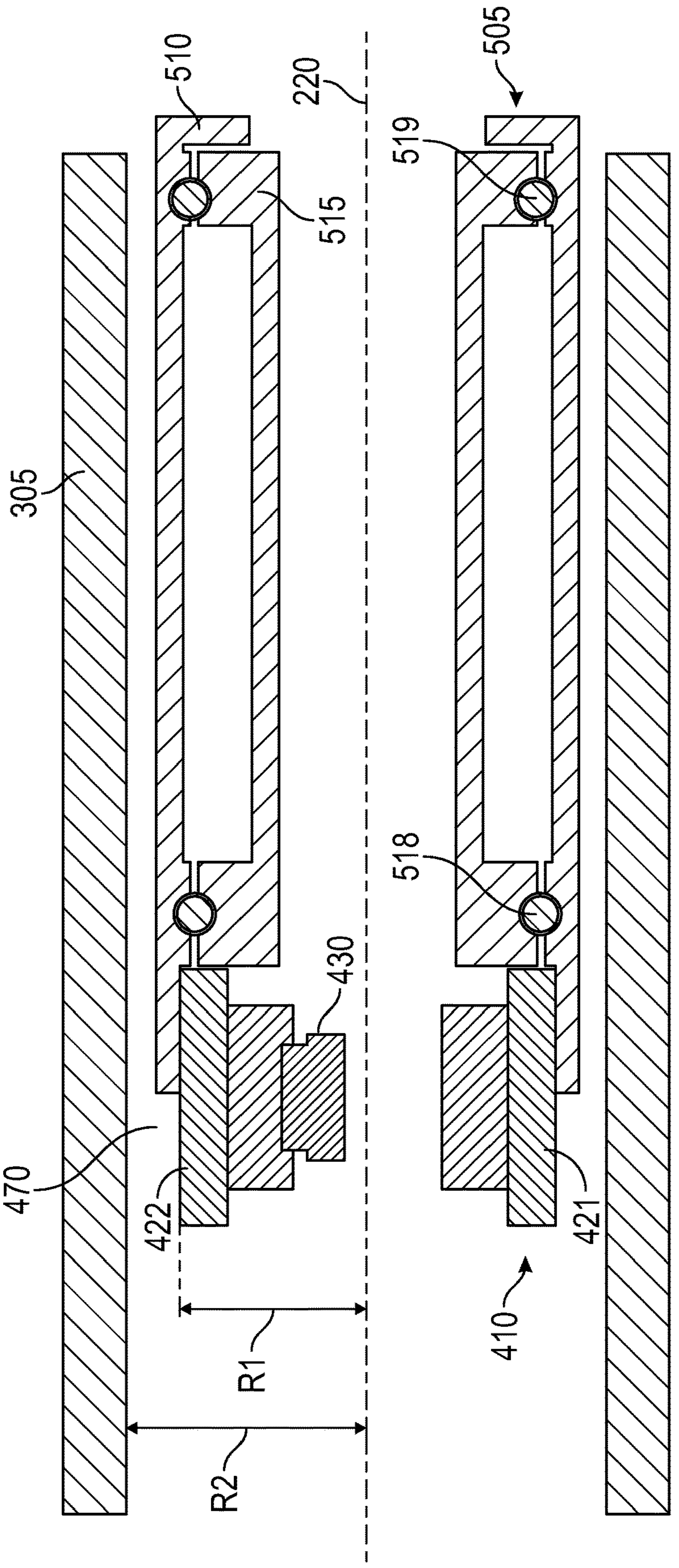
FIG. 5A shows a schematic, cross-sectional view taken along a centerline axis of the low-pressure shaft, of an insertion tool of some embodiments.

FIG. 5A conceptually illustrates an insertion tool 505 of some embodiments, for use with balancing devices that are solid disc assemblies with spring packs, such as balancing device 410. The insertion tool 505 is a cylindrical guide tube that has a pulling rod 510, a holding rod 515, and bearings 518, 519 to permit the pulling rod 510 to move independently of the holding rod 515.

Prior to using the insertion tool 505, weights such as weight 430 may be attached to the balancing device 410 at the desired angular position. For example, the weight 430 can be attached to slot 435 or hole 440 (FIG. 4A). The balancing device 410 is rotated prior to attachment to the insertion tool 505, if necessary, to align the weight 430 at the desired angular position.

The insertion tool 505 is then attached to the balancing device 410, by using the pulling rod 510 to compress the springs 445, 450, 455, 460 (not shown in FIG. 5A) by directly engaging the outer portions 420, 421, 422, 423 (FIGS. 4A-4C) of the balancing device 410. During compression, the balancing device 410 has an outer radius R1 that is less than the inner radius R2 of the low-pressure shaft 305. This creates a clearance 470 between the balancing device 410 and the inner surface of the low-pressure shaft 305.

During engagement with the insertion tool 505, the holding rod 515 also engages at least the outer portions 420, 421, 422, 423 (FIGS. 4A-4C) of the balancing device 410. The holding rod 515 and the pulling rod 510 simultaneously push the balancing device 410 into position along the low-pressure shaft 305, and remain engaged during placement.

The insertion tool 505 may have bearings, rollers, or other sliding or rolling means (not shown in FIG. 5A) that fit within the clearance 470 and support the insertion tool 505 in a centered position inside the low-pressure shaft 305 and around the centerline axis 220, as the insertion tool 505 traverses the low-pressure shaft 305.

Once the balancing device 410 has reached the desired axial position within the low-pressure shaft 305, the pulling rod 510 is pulled out of the low-pressure shaft 305. During withdrawal of the pulling rod 510, the bearings 518, 519, enable the pulling rod 510 to move freely while the holding rod 515 remains in place and engaged with the outer portions 420, 421, 422, 423 (FIGS. 4A-4C) of the balancing device 410. As the pulling rod 510 is withdrawn, the springs 445, 450, 455, 460 (FIGS. 4B-4C) are released and the outer radius R1 of the balancing device 410 increases to become equal to the inner radius R2 of the low-pressure shaft 305, locking the balancing device 410 into place. Anti-rotation pins 471, 472 (not shown in FIG. 5A) may also be inserted to secure the balancing device 410 against circumferential rotation, after the pulling rod 510 is withdrawn.

The holding rod 515 remains engaged and stationary during the release, so that the balancing device 410 is not pulled back from the desired axial position when the pulling rod 510 is withdrawn. After the pulling rod 510 is withdrawn, the balancing device 410 is fully locked into position and the holding rod 515 may also be disengaged without affecting the positioning.

Figure 5B:
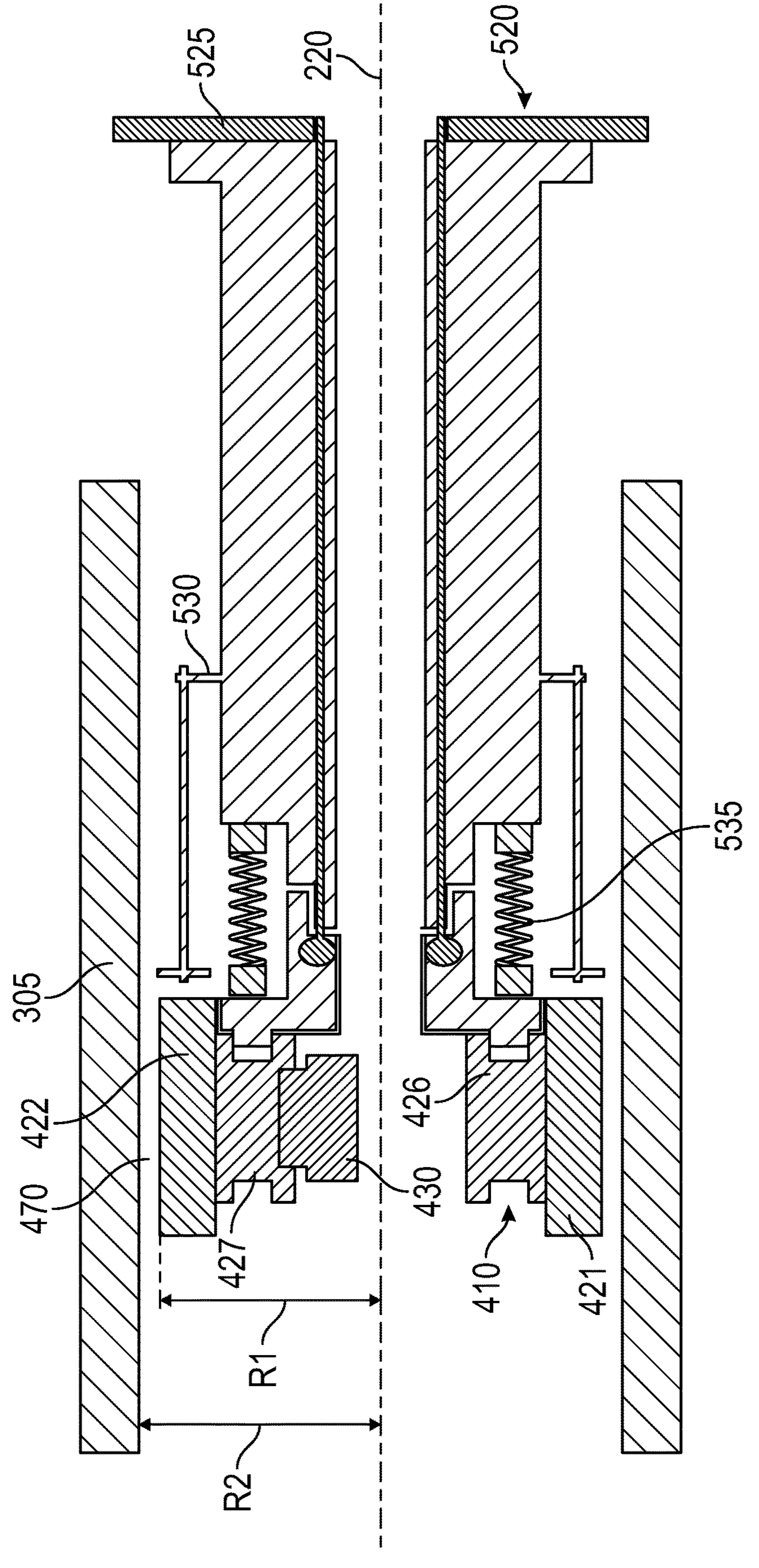
FIG. 5B shows a schematic, cross-sectional view taken along a centerline axis of the low-pressure shaft, of another insertion tool of some embodiments.

FIG. 5B conceptually illustrates another insertion tool 520 of some embodiments, for use with balancing devices that are solid disc assemblies with spring packs, such as balancing device 410. The insertion tool 520 is a cylindrical guide tube that has a pulling rod 525, a holding rod 530, and springs 535 to permit the pulling rod 525 to move independently of the holding rod 530.

Prior to using the insertion tool 520, weights such as weight 430 may be attached to the balancing device 410 at the desired angular position. For example, the weight 430 can be attached to slot 435 or hole 440 (FIG. 4A). The balancing device 410 is rotated prior to attachment to the insertion tool 520, if necessary, to align the weight 430 at the desired angular position.

The insertion tool 520 is then attached to the balancing device 410, by using the pulling rod 525 to compress the springs 445, 450, 455, 460 (not shown in FIG. 5B) by directly engaging the inner portions 425, 426, 427, 428 (FIG. 4A) of the balancing device 410. In some embodiments, the inner portions 425, 426, 427, 428 have a profile that match the profile of the pulling rod 525. When the profiles are aligned, the inner portions 425, 426, 427, 428 are solidly engaged with the pulling rod 525.

During compression, the balancing device 410 has an outer radius R1 that is less than the inner radius R2 of the low-pressure shaft 305. This creates a clearance 470 between the balancing device 410 and the inner surface of the low-pressure shaft 305.

During engagement with the insertion tool 520, the holding rod 530 also engages the outer portions 420, 421, 422, 423 (FIGS. 4A-4C) of the balancing device 410. The holding rod 530 and the pulling rod 525 simultaneously push the balancing device 410 into position along the low-pressure shaft 305, and remain engaged during placement.

The insertion tool 520 may have bearings, rollers, or other sliding or rolling means (not shown in FIG. 5B) that fit within the clearance 470 and support the insertion tool 520 in a centered position inside the low-pressure shaft 305 and around the centerline axis 220, as the insertion tool 520 traverses the low-pressure shaft 305.

Once the balancing device 410 has reached the desired axial position within the low-pressure shaft 305, the pulling rod 525 is pulled out of the low-pressure shaft 305. During withdrawal of the pulling rod 525, the springs 535 enable the pulling rod 525 to disengage from the inner portions 425, 426, 427, 428 (FIG. 4A) while the holding rod 530 remains in place and engaged with the outer portions 420, 421, 422, 423 of the balancing device 410. As the pulling rod 525 is withdrawn, the springs 445, 450, 455, 460 are released and the outer radius R1 of the balancing device 410 increases to become equal to the inner radius R2 of the low-pressure shaft 305, locking the balancing device 410 into place. Anti-rotation pins 471, 472 (not shown in FIG. 5B) may also be inserted to secure the balancing device 410 against circumferential rotation, after the pulling rod 525 is withdrawn.

The holding rod 530 remains engaged and stationary during the release, so that the balancing device 410 is not pulled back from the desired axial position when the pulling rod 525 is withdrawn. After the pulling rod 525 is withdrawn, the balancing device 410 is fully locked into position and the holding rod 530 may also be disengaged without affecting the positioning.

In some embodiments, the solid disc assembly includes multiple magnets, each magnet being positioned between two of the solid segments, and each magnet exerting a magnetic force upon adjacent solid segments that couples the solid segments to each other. Each magnet may also be positioned to prevent rotation of the solid disc within the shaft by magnetically coupling to an inner surface of the shaft at the particular position.

Figure 6:
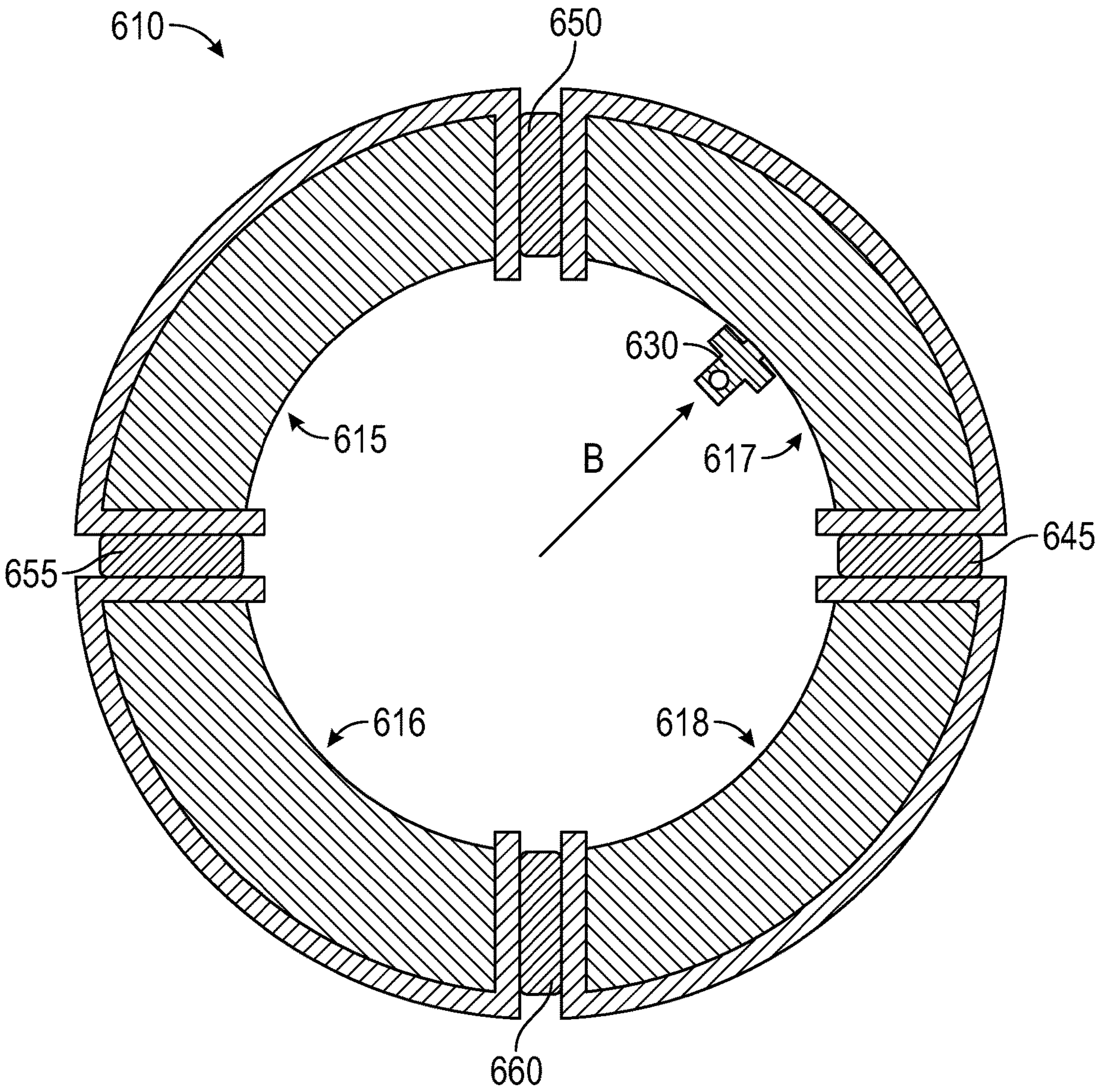
FIG. 6 shows a schematic, cross-sectional view of another example of a balancing device, that is a solid disc assembly with multiple segments.

FIG. 6 shows another example of a balancing device 610 that is a solid disc assembly with multiple segments 615, 616, 617, 618. The balancing device 610 is similar to the embodiment of the balancing device 410 discussed above with respect to FIGS. 4A to 4C, and like reference numerals have been used to refer to the same or similar components. A detailed description of these components will be omitted, and the following discussion focuses on the differences between these embodiments. Any of the various features discussed with any one of the embodiments discussed herein may also apply to and be used with any other embodiments.

In the example of FIG. 6, the segment 617 has a weight 630 attached at an angular position indicated by arrow B. The balancing device 610 is shown in a pre-insertion state, outside of the low-pressure shaft 305 (not shown in FIG. 6). The weight 630 was attached prior to insertion of the balancing device 610 within the low-pressure shaft 305.

The balancing device 610 also includes magnets 645, 650, 655, 660, inserted between the segments 615, 616, 617, 618. These magnets 645, 650, 655, 660 exert a magnetic force on their adjacent segments 615, 616, 617, 618 that couples the segments 615, 616, 617, 618 to each other. In this example, magnet 645 couples segment 617 to segment 618, magnet 650 couples segment 615 to segment 617, magnet 655 couples segment 615 to segment 616, and magnet 660 couples segment 616 to segment 618. The magnets 645, 650, 655, 660 also serve as spacers to maintain the proper position of the segments 615, 616, 617, 618 relative to each other. By maintaining the proper spacing, the outer radius R1 (not shown in FIG. 6) of the balancing device 610 may be equal to the inner radius R2 (not shown in FIG. 6) of the low-pressure shaft 305, locking the balancing device 610 into position. In some embodiments, the magnets 645, 650, 655, 660 are inserted into position between the segments 615, 616, 617, 618 after the balancing device 610 has been inserted into the low-pressure shaft 305 at the desired axial position.

In some embodiments, the magnets 645, 650, 655, 660 are also used to couple the segments 615, 616, 617, 618 to the interior surface of the low-pressure shaft 305. In this manner, the magnets 645, 650, 655, 660 also serve an anti-rotation function, by preventing circumferential rotation of the balancing device 610 within the low-pressure shaft 305.

In some embodiments, the annular insert is a unitary disc that has an outer radius that is less than the inner radius of the shaft. Multiple clamps are coupled to the shaft at the desired axial position, located at different angular positions. These clamps engage the unitary disc, and secure the unitary disc into place so that the unitary disc does not directly come into contact with the shaft. In this embodiment, the unitary disc is inserted into the shaft at the desired axial position by an insertion tool that couples the solid disc to the clamps. The clamps also prevent rotation of the unitary disc within the shaft by physically coupling the shaft to the unitary disc.

Figure 7A:
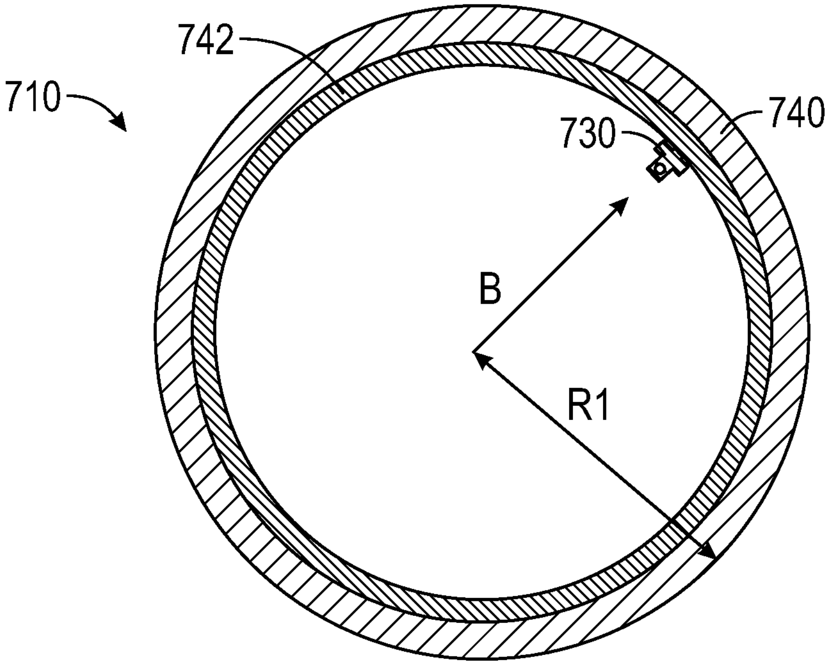
FIG. 7A shows a schematic, cross-sectional view of another example of a balancing device, that is a unitary disc with a weight attached.

FIG. 7A shows another example of a balancing device 710 that is a unitary disc with a weight 730 attached. Note that the low-pressure shaft 305 is omitted from FIG. 7A for clarity. The balancing device 710 is similar to the embodiment of the balancing device 410 discussed above with respect to FIGS. 4A to 4C, and like reference numerals have been used to refer to the same or similar components. A detailed description of these components will be omitted, and the following discussion focuses on the differences between these embodiments. Any of the various features discussed with any one of the embodiments discussed herein may also apply to and be used with any other embodiments.

The balancing device 710 has an outer portion 740 that comes into contact with the interior surface of the low-pressure shaft 305, and an inner portion 742 to which the weight 730 attaches. The inner portion 742 and the outer portion 740 may be different components that are joined together (e.g., by welding) or alternatively may be different portions of a single, unitary component. In this example, the weight 730 attaches by a slot (not shown in FIG. 7A) in the inner portion 342. In this example, the balancing device 710 has been rotated so that weight 730 is at an angular position indicated by solid arrow B. The outer radius R1 of the unitary disc is also shown.

Figure 7B:
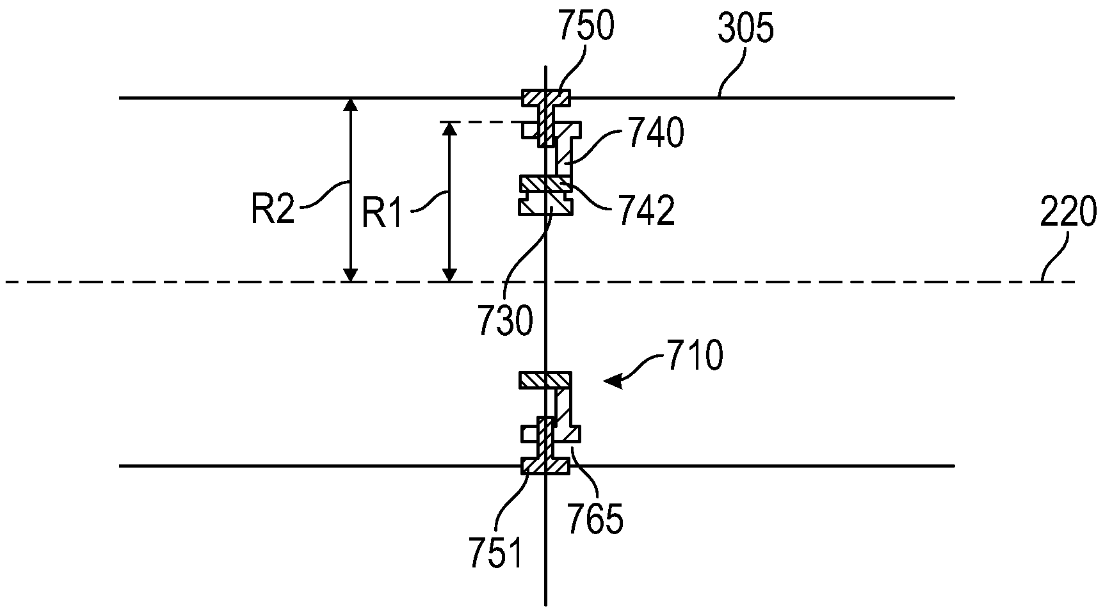
FIG. 7B shows a schematic, cross-sectional view taken along a centerline axis of the low-pressure shaft, of the balancing device of FIG. 7A, after being inserted into the low-pressure shaft.

FIG. 7B shows the balancing device 710 inserted into the low-pressure shaft 305. The outer radius R1 of the balancing device 710 is less than the inner radius R2 of the low-pressure shaft 305. The low-pressure shaft 305 has multiple clamps 750, 751 located at the desired axial position, positioned around the circumference of the low-pressure shaft 305. The clamps 750, 751 engage with the outer portion 740 of the balancing device 710 to secure the balancing device 710 in place at the desired axial position. Since the outer radius R1 of the balancing device 710 is less than the inner radius R2 of the low-pressure shaft 305, the clamps 750, 751 ensure that there is a clearance 765 around the entire circumference of the balancing device 710, such that the balancing device 710 is centered around the centerline axis 220. The clamps 750, 751 also serve to prevent circumferential rotation of the balancing device 710 within the low-pressure shaft 305.

The clamps 750, 751 may engage with the outer portion 740 of the balancing device 710 through any mechanical means, such as screws or clips. For example, the outer portion 740 may have a lip or a pin at multiple positions around the circumference of the balancing device 710, that extend through corresponding openings in the clamps 750, 751. As an alternative example, fasteners (not shown in FIG. 7B) may be used to secure the outer portion 740 to the clamps 750, 751.

Figure 8:
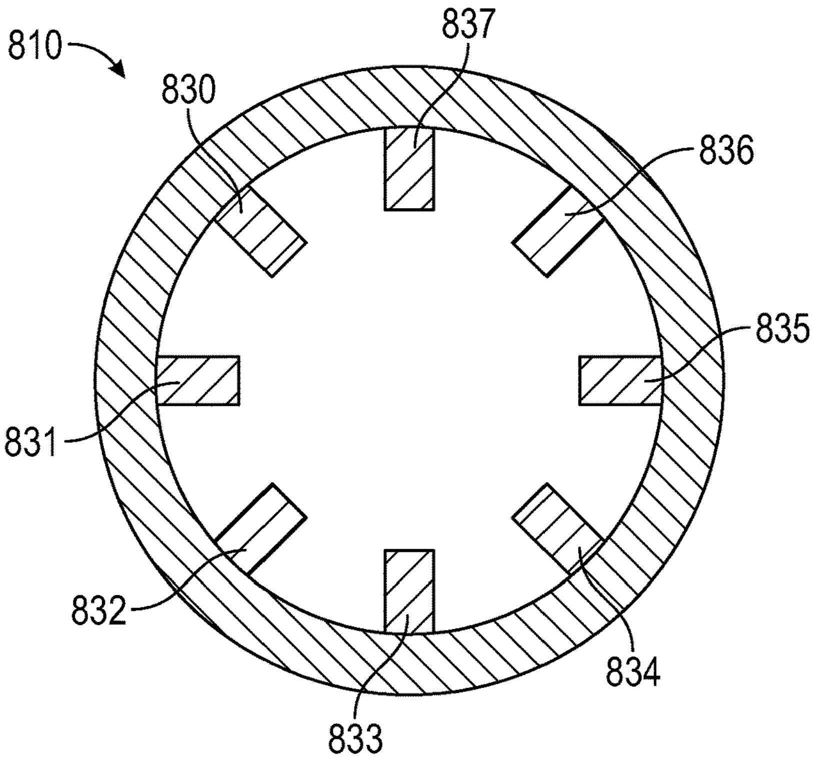
FIG. 8 shows a schematic, cross-sectional view of another example of a balancing device, that is a cylindrical insert.

FIG. 8 shows another example of a balancing device 810 that is a cylindrical insert 812. The cylindrical insert 812 is placed within the low-pressure shaft 305 (not shown in FIG. 8) at the desired axial position. The cylindrical insert 812 is coaxial to the centerline axis 220 (not shown in FIG. 8). One or more weights 830, 831, 832, 833, 834, 835, 836, 837 couple to the interior surface of the cylindrical insert 812 at the desired angular position(s), using fasteners such as a screw or a magnet.

Figure 9:
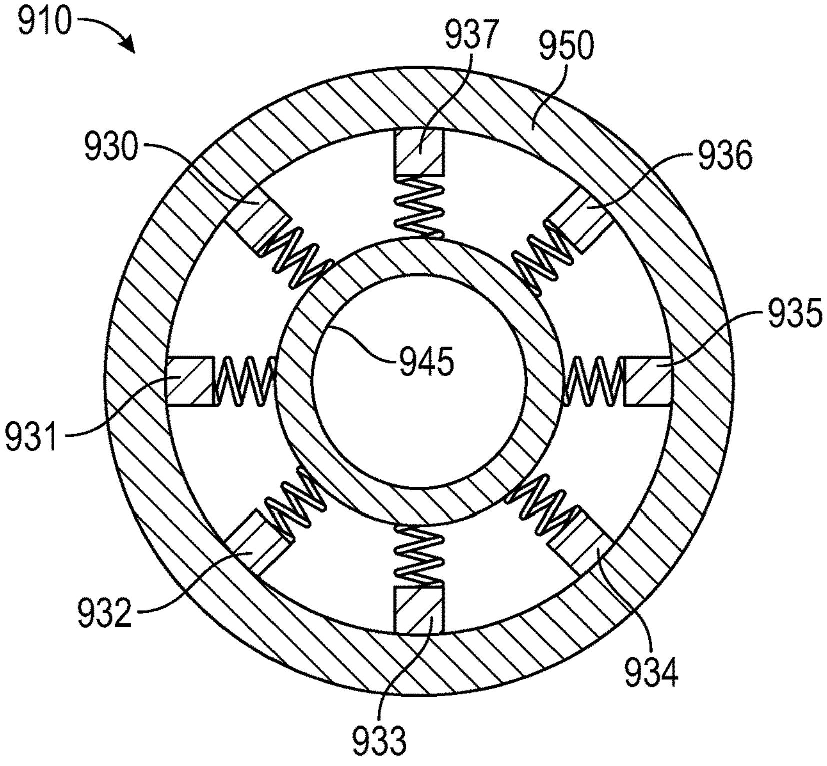
FIG. 9 shows a schematic, cross-sectional view of another example of a balancing device, that is a dual-cylindrical insert.

FIG. 9 shows another example of a balancing device 910 that is a dual-cylindrical insert 912. The dual-cylindrical insert 912 is placed within the low-pressure shaft 305 (not shown in FIG. 9) at the desired axial position. One or more spring-loaded weights 930, 931, 932, 933, 934, 935, 936, 937 are mounted to an inner cylinder 945 at the desired angular position(s). The springs exert a force that causes the spring-loaded weights 930, 931, 932, 933, 934, 935, 936, 937 to engage with a compressible outer cylinder 950, which is coaxial with the inner cylinder 945 around the centerline axis 220 (not shown in FIG. 9). The inner cylinder 945 and the outer cylinder 950 may be connected by axial support members (not shown in FIG. 9). Compression of the springs permits the outer cylinder 950 to be inserted within the low-pressure shaft 305 at the desired axial position. When the springs are released, the outer cylinder 950 locks into place at the desired axial position within the low-pressure shaft 305.

Figure 10:
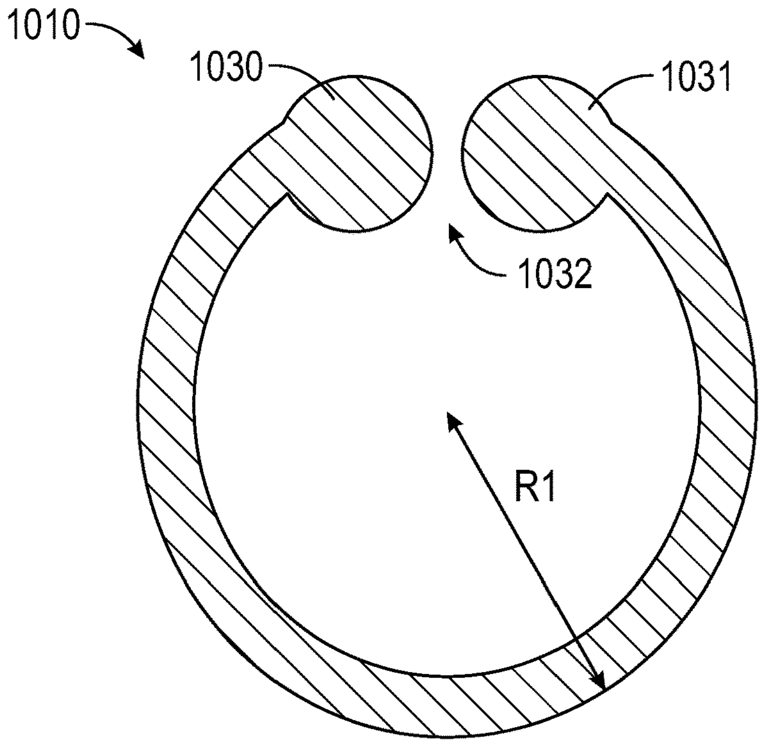
FIG. 10 shows a schematic, cross-sectional view of another example of a balancing device that is a weighted split ring.

FIG. 10 shows another example of a balancing device 1010 that is a weighted split ring 1012. The weighted split ring 1012 is placed within the low-pressure shaft 305 (not shown in FIG. 10) at the desired axial position. The weighted split ring 1012 has a first thickness that extends around a majority of the inner circumference of the low-pressure shaft 305. At both ends, the weighted split ring 1012 has a greater thickness, causing the ends of the weighted split ring 1012 to function as integral weights 1030, 1031. Even with the greater thickness at the ends, the weighted split ring 1012 has a gap 1032 between the integral weights 1030, 1031. In its uncompressed state, the outer radius R1 of the weighted split ring 1012 is equal to the inner radius R2 of the low-pressure shaft 305.

The weighted split ring 1012 is rotated prior to insertion so that the integral weights are at the desired angular position. During insertion, the weighted split ring 1012 is compressed to close the gap and to permit the weighted split ring 1012 to be moved to the desired axial position. In its compressed state, the outer radius R1 of the weighted split ring 1012 is less than the inner radius R2 of the low-pressure shaft 305.

Once at the desired axial position, the weighted split ring 1012 is then released, and the outer radius R1 expands so that the integral weights 1030, 1031 are engaged with the inner surface of the low-pressure shaft 305. The weighted split ring 1012 is accordingly locked into place at the desired axial position.

In some embodiments, the annular insert is a hollow disc assembly with multiple hollow segments, each hollow segment spanning a portion of the interior circumference of the shaft. The weight is a fluid or a powder that fills at least one of the hollow segments. The hollow disc assembly may be inserted into the shaft at a desired axial position by an insertion tool that shrinks the hollow disc assembly by cooling during insertion, to move the hollow disc assembly to the desired axial position along the shaft. The insertion tool stops cooling the hollow disc assembly at the desired axial position to allow the hollow disc assembly to expand and to lock into place.

Figure 11:
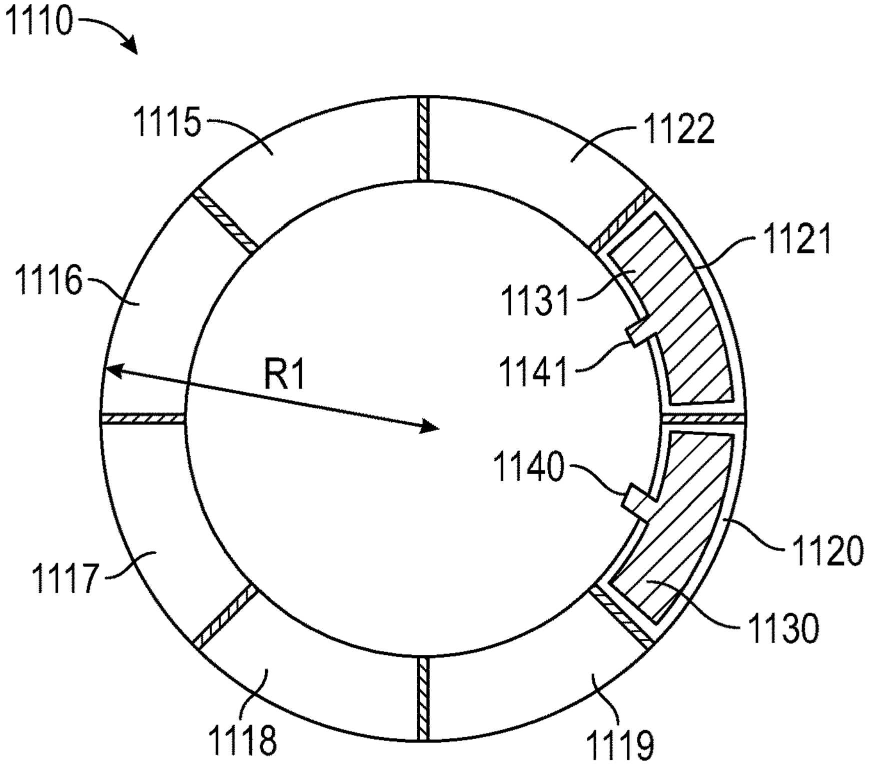
FIG. 11 shows a schematic, cross-sectional view of another example of a balancing device that is a hollow disc assembly with two or more hollow segments.

FIG. 11 shows another example of a balancing device 1110 that is a hollow disc assembly with two or more hollow segments 1115, 1116, 1117, 1118, 1119, 1120, 1121, 1122. Note that the low-pressure shaft 305 is omitted from FIG. 11 for clarity. In this example, hollow segments 1120, 1121 have been filled with weights 1130, 1131. The weights 1130, 1131 in this example are a fluid or a powder, that is delivered into the hollow segments 1120, 1121 through ports 1140, 1141. The ports 1140, 1141 may be a valve in the case of fluid weights or a seal in the case of powder weights.

Initially, the outer radius R1 of the balancing device 1110 is equal to the inner radius R2 of the low-pressure shaft 305 (not shown in FIG. 11). In some embodiments, the balancing device 1110 is inserted using an insertion tool (not shown in FIG. 11) that cools the balancing device 1110 in order to cause the outer radius R1 to shrink, so that the outer radius R1 becomes less than the inner radius of the low-pressure shaft 305. Once the balancing device 1110 is at the desired axial position, the insertion tool ceases to cool the balancing device 1110, or commences to heat the balancing device 1110. The balancing device 1110 then expands back to the original outer radius R1 and locks into place at the desired axial position within the low-pressure shaft 305.

In some embodiments, some or all of the hollow segments 1115, 1116, 1117, 1118, 1119, 1120, 1121, 1122 may be filled prior to insertion of the balancing device 1110 into the low-pressure shaft 305. However, the hollow segments 1115, 1116, 1117, 1118, 1119, 1120, 1121, 1122 may also be filled after insertion, by the insertion tool.

Further aspects of the present disclosure are provided by the subject matter of the following clauses.

A device for balancing a shaft in a turbomachine engine, the device including an annular insert configured to be positioned inside the shaft at a particular axial position along the shaft, and a weight that is attached to the annular insert at a particular angular position inside the shaft.

The device of the preceding clause, where the annular insert is a solid disc assembly, and the weight removably couples to the solid disc assembly by a receiver in the solid disc assembly.

The device of any of the preceding clauses, where the weight is coupled to the solid disc assembly by one of a keyway, a clip, a metal strip, and a screw.

The device of any of the preceding clauses, where the receiver is one of a slot in the solid disc assembly and a hole in the solid disc assembly.

The device of any of the preceding clauses, where the solid disc assembly includes a plurality of solid segments, each solid segment spanning a portion of an interior circumference of the shaft and having at least one receiver, and where the weight couples to one receiver in one of the solid segments.

The device of any of the preceding clauses, further including an anti-rotation pin that extends through a surface of the shaft and into one of the solid segments of the solid disc assembly, the anti-rotation pin preventing rotation of the solid disc assembly within the shaft by physically coupling the shaft to each solid segment.

The device of any of the preceding clauses, where the solid disc assembly further includes a plurality of springs, each spring being positioned between two solid segments, and each spring exerting a pressure upon adjacent solid segments, the pressure coupling the solid segments to each other.

The device of any of the preceding clauses, where the solid disc assembly is inserted into the shaft at the particular axial position by an insertion tool that (a) simultaneously compresses the plurality of springs during insertion to move the solid disc assembly along the shaft to the particular axial position, and (b) simultaneously releases the plurality of springs when the solid disc assembly reaches the particular axial position to allow the plurality of springs to expand and thereby to lock the solid disc assembly into place at the particular axial position.

The device of any of the preceding clauses, where the insertion tool includes a pulling rod to release the plurality of springs, and a holding rod to hold the solid disc assembly at the particular axial position during the release of the plurality of springs by the pulling rod.

The device of any of the preceding clauses, where the solid disc assembly further includes a plurality of magnets, each magnet being positioned between two of the solid segments, and each magnet exerting a magnetic force upon adjacent solid segments, the magnetic force coupling the solid segments to each other.

The device of any of the preceding clauses, where each magnet is further positioned to prevent rotation of the solid disc assembly within the shaft by magnetically coupling to an inner surface of the shaft at the particular axial position.

The device of any of the preceding clauses, where the annular insert is a hollow disc assembly that includes a plurality of hollow segments, each hollow segment spanning a portion of an interior circumference of the shaft.

The device of any of the preceding clauses, where the weight is one of a fluid and a powder that fills at least one of the hollow segments.

The device of any of the preceding clauses, where the hollow disc assembly is inserted into the shaft at the particular axial position by an insertion tool that (a) shrinks the hollow disc assembly by cooling during insertion to move the hollow disc assembly to the particular axial position along the shaft, and (b) stops cooling the hollow disc assembly at the particular axial position along the shaft to allow the hollow disc assembly to expand and to lock into place at the particular axial position.

The device of any of the preceding clauses, where the annular insert is a unitary disc that has an outer radius that is less than an inner radius of the shaft, where the device further includes a plurality of clamps coupled to the shaft at the particular axial position, the plurality of clamps being at different angular positions at the particular axial position, the plurality of clamps supporting the unitary disc within the shaft at the particular axial position so that the unitary disc does not directly come into contact with the shaft.

The device of any of the preceding clauses, where the unitary disc is inserted into the shaft at the particular axial position by an insertion tool that couples the unitary disc to the plurality of clamps, and where the plurality of clamps prevent rotation of the unitary disc within the shaft by physically coupling the shaft to the unitary disc.

The device of any of the preceding clauses, where the annular insert includes an outer cylindrical insert, and the weight couples to an interior surface of the outer cylindrical insert at the particular angular position by one of a screw and a magnet.

The device of any of the preceding clauses, where the annular insert includes an inner cylindrical insert, the weight being coupled to the inner cylindrical insert by a spring, where compression of the spring permits the outer cylindrical insert to be inserted within the shaft at the particular axial position.

The device of any of the preceding clauses, where the annular insert includes a clip with a first thickness that extends around a portion of an inner circumference of the shaft, where the weight includes a first end of the clip and a second end of the clip, the first end of the clip and the second end of the clip each having a second thickness that is greater than the first thickness, and the clip having an uncompressed state that defines a gap between the first end of the clip and the second end of the clip.

The device of any of the preceding clauses, where the clip is inserted into the shaft by compressing the clip so that the gap between the first end of the clip and the second end of the clip is at least partially closed, so that an outer radius of the clip is reduced, where the clip is locked into place within the shaft at the particular axial position by releasing the clip, so that the outer radius of the clip is restored, and where the clip is rotated during insertion to arrange both the first end of the clip and the second end of the clip at the particular angular position.

Although the foregoing description is directed to the preferred embodiments, it is noted that other variations and modifications will be apparent to those skilled in the art, and may be made without departing from the spirit or scope of the disclosure Moreover, features described in connection with one embodiment may be used in conjunction with other embodiments, even if not explicitly stated above.

The invention claimed is:

1. A device for balancing a shaft in a turbomachine engine, the device comprising:

a solid disc assembly comprising a plurality of solid segments, each solid segment spanning a portion of an interior circumference of the shaft and having at least one receiver, the solid disc assembly configured to be positioned inside the shaft at a particular axial position along the shaft; and a weight that is removably coupled to one of the solid segments of the solid disc assembly by a receiver in the one of the solid segments of the solid disc assembly at a particular angular position inside the shaft.

2. The device of claim 1, further comprising an anti-rotation pin that extends through a surface of the shaft and into one of the solid segments of the solid disc assembly, the anti-rotation pin preventing rotation of the solid disc assembly within the shaft by physically coupling the shaft to each solid segment.

3. The device of claim 1, wherein the solid disc assembly further comprises a plurality of springs, each spring being positioned between two adjacent solid segments, and each spring exerting a pressure upon the two adjacent solid segments, the pressure coupling the solid segments to each other.

4. The device of claim 3, wherein the solid disc assembly is inserted into the shaft at the particular axial position by an insertion tool that (a) simultaneously compresses the plurality of springs during insertion to move the solid disc assembly along the shaft to the particular axial position, and (b) simultaneously releases the plurality of springs when the solid disc assembly reaches the particular axial position to allow the plurality of springs to expand and thereby to lock the solid disc assembly into place at the particular axial position.

5. The device of claim 4, wherein the insertion tool comprises a pulling rod to release the plurality of springs, and a holding rod to hold the solid disc assembly at the particular axial position during the release of the plurality of springs by the pulling rod.

6. The device of claim 1, wherein the solid disc assembly further comprises a plurality of magnets, each magnet being positioned between two adjacent solid segments, and each magnet exerting a magnetic force upon the two adjacent solid segments, the magnetic force coupling the solid segments to each other.

7. The device of claim 6, wherein each magnet is further positioned to prevent rotation of the solid disc assembly within the shaft by magnetically coupling to an inner surface of the shaft at the particular axial position.

8. A device for balancing a shaft in a turbomachine engine, the device comprising:

a hollow disc assembly configured to be positioned inside the shaft at a particular axial position along the shaft, the hollow disc assembly comprising a plurality of hollow segments, each hollow segment spanning a portion of an interior circumference of the shaft; and a weight that is attached to the hollow disc assembly at a particular angular position inside the shaft, the weight being a fluid or a powder that fills at least one of the hollow segments.

9. A device for balancing a shaft in a turbomachine engine, the device comprising:

a hollow disc assembly configured to be positioned inside the shaft at a particular axial position along the shaft, the hollow disc assembly comprising a plurality of hollow segments, each hollow segment spanning a portion of an interior circumference of the shaft; and a weight that is attached to the hollow disc assembly at a particular angular position inside the shaft, wherein the hollow disc assembly is inserted into the shaft at the particular axial position by an insertion tool that (a) shrinks the hollow disc assembly by cooling during insertion to move the hollow disc assembly to the particular axial position along the shaft, and (b) stops cooling the hollow disc assembly at the particular axial position along the shaft to allow the hollow disc assembly to expand and to lock into place at the particular axial position.

10. A device for balancing a shaft in a turbomachine engine, the device comprising:

a unitary disc that has an outer radius that is less than an inner radius of the shaft, the unitary disc configured to be positioned inside the shaft at a particular axial position along the shaft;

a weight that is attached to the unitary disc at a particular angular position inside the shaft; and a plurality of clamps coupled to the shaft at the particular axial position, the plurality of clamps being at different angular positions at the particular axial position, the plurality of clamps supporting the unitary disc within the shaft at the particular axial position so that the unitary disc does not directly come into contact with the shaft.

11. The device of claim 10, wherein the unitary disc is inserted into the shaft at the particular axial position by an insertion tool that couples the unitary disc to the plurality of clamps, and wherein the plurality of clamps prevent rotation of the unitary disc within the shaft by physically coupling the shaft to the unitary disc.

12. A device for balancing a shaft in a turbomachine engine, the device comprising:

an annular insert comprising an outer cylindrical insert, the annular insert configured to be positioned inside the shaft at a particular axial position along the shaft; and a weight that is removably coupled to, and extending from, an interior surface of the outer cylindrical insert at a particular angular position inside the shaft by a screw or a magnet.

13. The device of claim 12, wherein the annular insert further comprises an inner cylindrical insert, the weight being coupled to the inner cylindrical insert by a spring, wherein compression of the spring permits the outer cylindrical insert to be inserted within the shaft at the particular axial position.

14. A device for balancing a shaft in a turbomachine engine, the device comprising:

a weighted split ring configured to be positioned inside the shaft at a particular axial position along the shaft, the weighted split ring comprising:

a center portion with a first thickness that extends around a portion of an inner circumference of the shaft;

a first integral weight attached to the weight split ring at a particular angular position inside the shaft, the first integral weight defining a first end of the weighted split ring; and a second integral weight attached to the weighted split ring at a particular angular position inside the shaft, the second integral weight defining a second end of the weighted split ring, wherein the first end of the weighted split ring and the second end of the weighted split ring each has a second thickness that is greater than the first thickness, and the weighted split ring has an uncompressed state that defines a gap between the first end of the weighted split ring and the second end of the weighted split ring.

15. The device of claim 14, wherein the weighted split ring is inserted into the shaft by compressing the weighted split ring so that the gap between the first end of the weighted split ring and the second end of the weighted split ring is at least partially closed and an outer radius of the weighted split ring is reduced, and the weighted split ring is locked into place within the shaft at the particular axial position by releasing the weighted split ring so that the outer radius of the weighted split ring is restored.

16. The device of claim 15, wherein the weighted split ring is rotated during insertion to arrange both the first end of the weighted split ring and the second end of the weighted split ring at the particular angular position.

* * * * *